UNITED STATES PATENT OFFICE.

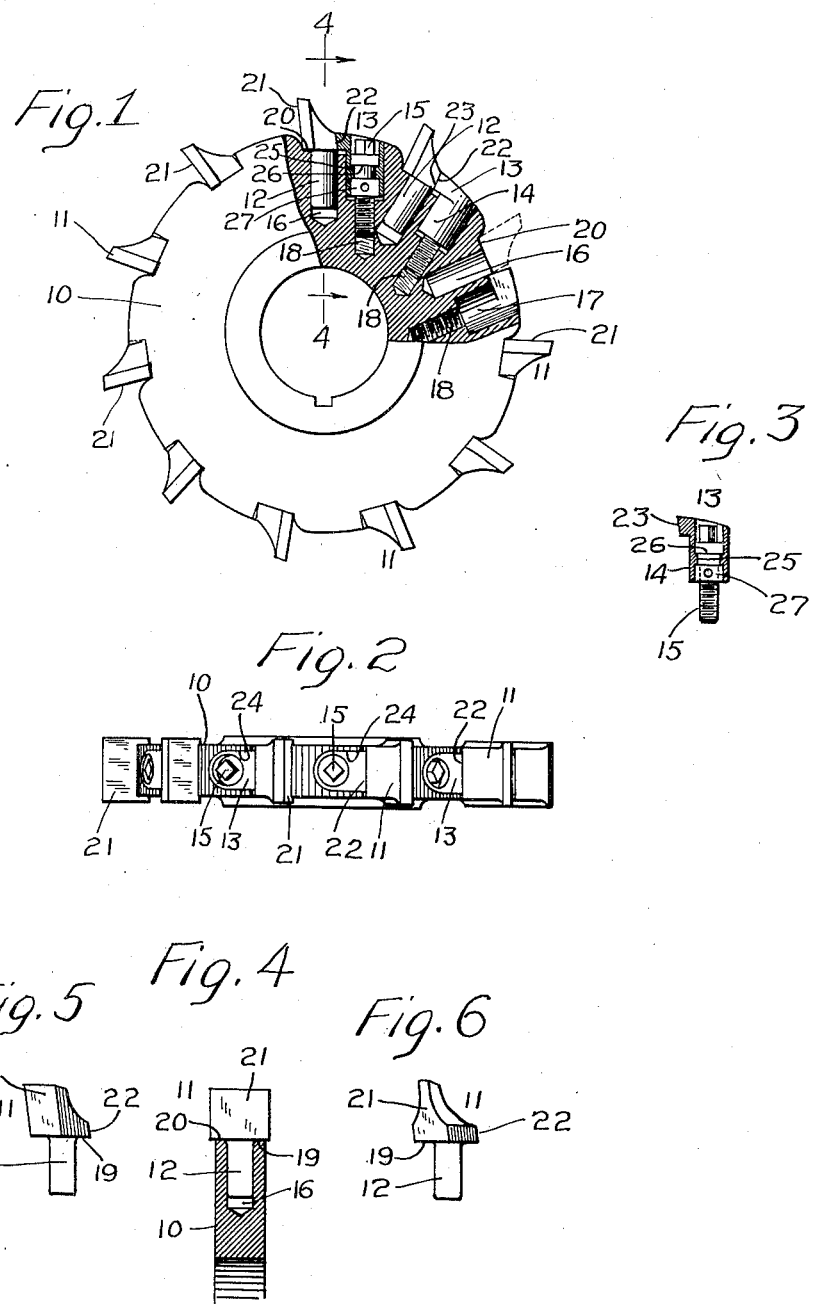

GEORGE W. CONKLIN, OF SHELTON, CONNECTICUT, ASSIGNOR TO THE O. K. TOOL HOLDER COMPANY, OF SHELTON, CONNECTICUT, A CORPORATION OF NEW YORK.

MILLING-CUTTER.

1,063,659.  Specification of Letters Patent.  Patented June 3, 1913.

Application filed December 2, 1912. Serial No. 734,490.

*To all whom it may concern:*

Be it known that I, GEORGE W. CONKLIN, a citizen of the United States, residing at Shelton, county of Fairfield, State of Connecticut, have invented an Improvement in Milling-Cutters, of which the following is a specification.

This invention has for its object to provide a simple, inexpensive and extremely durable detachable tooth milling cutter adapted for general use and especially adapted for use upon work where the greatest accuracy is required, as in gear cutting, a use in which it is essential that the teeth be locked absolutely rigidly against any movement independently of the disk.

With the above and other objects in view, I have devised the novel milling cutter which I will now describe, referring to the accompanying drawing forming a part of this specification and using reference characters to indicate the several parts.

Figure 1 is a view of my novel milling cutter partly in elevation and partly in section; Fig. 2 an inverted plan view corresponding therewith; Fig. 3 a detail view partly in elevation and partly in section of a locking block and locking screw detached; Fig. 4 a section on the line 4—4 in Fig. 1, looking in the direction of the arrows, showing the manner in which the teeth are locked against lateral movement, and Figs. 5 and 6 are views of different styles of teeth detached.

10 denotes the disk, 11 the teeth having reduced shanks 12, 13 locking blocks having reduced shanks 14 and 15 locking screws. The disk is provided in its periphery with radial sockets 16 which receive the shanks of the teeth and with sockets 17 parallel with the radial sockets which receive the shanks of the locking blocks. Below sockets 17 are threaded holes 18 which are engaged by the locking screws. The bases of the teeth, indicated by 19, are flat and rest upon flat surfaces 20 on the periphery of the disk contiguous to sockets 16. An essential feature of the present invention is that the front facial lines of the teeth, indicated by 21, and the axial lines of the shanks of the teeth are radial and the axial lines of the shanks of the locking blocks are parallel with the axial lines of the teeth and consequently not radial. The backs of the teeth, indicated by 22, are inclines extending downward from the cutting edges and outward from the axial lines. These inclines are engaged by corresponding undercut inclines 23 on the forward faces of the locking blocks. It should be noted (see Fig. 2) that the sides and back of the locking blocks are inclosed by walls 24 on the periphery of the disk. The shanks of the locking blocks are provided with central holes, each having a circular rib 25. The locking screws are provided with shoulders 26 which engage the ribs and are retained in engagement with the locking blocks by means of removable collars 27 which engage the under sides of the ribs, the threads of the locking screws engaging the threaded holes below sockets 17.

The operation will be readily understood from the drawing. The locking screws are placed in the locking blocks and secured there by means of collars 27. The teeth are placed in position, as clearly shown in Fig. 1, with shanks 12 in sockets 16. The shanks of the locking blocks are then placed in sockets 17 and the locking screws are engaged with holes 18. Turning of the locking screws downward will move the locking blocks inward between walls 24, and the overhanging inclines 23 on the locking blocks will engage the downwardly and outwardly extending inclines on the backs of the teeth so that the teeth, while they may be readily inserted and removed, will be locked in place absolutely rigidly, there being no possibility of movement of the teeth in any direction that is appreciable even in the very finest work.

Having thus described my invention I claim:

1. A cutter of the character described, comprising a disk having radial sockets in its periphery and other sockets parallel with the radial sockets, teeth having shanks engaging the radial sockets and outwardly extending inclines, locking blocks having undercut inclines engaging the inclines of the teeth and shanks engaging the second mentioned sockets and locking screws having rotary engagement with the locking blocks and threaded engagement with the disk.

2. A cutter of the character described, comprising a disk having radial sockets in its periphery, other sockets parallel with the radial sockets, and flat surfaces, teeth having bases engaging said surfaces and shanks engaging the radial sockets, locking blocks having shanks engaging the other sockets and locking screws in the shanks of the blocks and engaging the disk, whereby the blocks are caused to lock the teeth.

3. A cutter of the character described, comprising a disk having radial sockets in its periphery, other sockets parallel with the radial sockets and walls partly inclosing said other sockets, teeth having reduced shanks engaging the radial sockets, locking blocks lying within said walls and having reduced shanks engaging said other sockets and locking screws engaging the blocks and having threaded engagement with the disk.

In testimony whereof I affix my signature in presence of two witnesses.

GEORGE W. CONKLIN.

Witnesses:
CAROLINE L. WHEELDEN,
ALFRED SCHMINNICK.